United States Patent
Katz

(10) Patent No.: US 10,203,812 B2
(45) Date of Patent: Feb. 12, 2019

(54) SYSTEMS, DEVICES, AND METHODS FOR TOUCH-FREE TYPING

(71) Applicant: EYESIGHT MOBILE TECHNOLOGIES LTD., Herzliya (IL)

(72) Inventor: Itay Katz, Tel Aviv (IL)

(73) Assignee: Eyesight Mobile Technologies, Ltd., Herzliya (IL)

(*) Notice: Subject to any disclaimer, the term of this patent is extended or adjusted under 35 U.S.C. 154(b) by 0 days.

(21) Appl. No.: 15/028,098

(22) PCT Filed: Oct. 9, 2014

(86) PCT No.: PCT/IB2014/002823
§ 371 (c)(1),
(2) Date: Apr. 8, 2016

(87) PCT Pub. No.: WO2015/052588
PCT Pub. Date: Apr. 16, 2015

(65) Prior Publication Data
US 2016/0253044 A1    Sep. 1, 2016

Related U.S. Application Data

(60) Provisional application No. 61/889,348, filed on Oct. 10, 2013.

(51) Int. Cl.
G06F 3/042    (2006.01)
G06F 3/01    (2006.01)
(Continued)

(52) U.S. Cl.
CPC ............ *G06F 3/0426* (2013.01); *G06F 3/017* (2013.01); *G06F 3/0304* (2013.01); *G06F 3/04842* (2013.01); *G06F 2203/04108* (2013.01)

(58) Field of Classification Search
CPC .... G06F 3/0426; G06F 3/04842; G06F 3/017; G06F 3/0304; G06F 2203/04108
See application file for complete search history.

(56) References Cited

U.S. PATENT DOCUMENTS 6,323,884 B1 * 11/2001 Bird .................... G06F 3/04812
                                                                    715/810
6,512,838 B1 *  1/2003 Rafii ....................... G01C 3/08
                                                                    348/E3.018

(Continued)

*Primary Examiner* — Jose Soto Lopez
(74) *Attorney, Agent, or Firm* — Finnegan, Henderson, Farabow, Garrett & Dunner LLP

(57) ABSTRACT

Systems, devices, methods, and non-transitory computer-readable media are provided for receiving data input via touch-free gestures and movements. For example, a data input device includes at least one processor for receiving information from a sensor. The processor may be configured to receive sensor data from the sensor of a user's hand spaced a distance from a displayed keyboard and in non-contact with the displayed keyboard, and track, using the received sensor data, one or more fingers in air a distance from the displayed keyboard image. The processor may also be configured to correlate locations of the one or more fingers in the air with images of a plurality of keys in the displayed keyboard, and select keys from the keyboard image based on the correlated locations of the one or more fingers in the air, and a detection of a predefined gesture performed by the user.

46 Claims, 7 Drawing Sheets

(51) Int. Cl.
*G06F 3/03* (2006.01)
*G06F 3/0484* (2013.01)

(56) References Cited

U.S. PATENT DOCUMENTS

| | | | | |
|---|---|---|---|---|
| 8,928,589 B2* | 1/2015 | Bi | G06F 3/0425 | 345/168 |
| 2001/0035858 A1* | 11/2001 | Blumberg | G06F 3/011 | 345/168 |
| 2008/0136679 A1* | 6/2008 | Newman | G06F 3/017 | 341/20 |
| 2010/0079310 A1* | 4/2010 | Nachman | G06F 3/0233 | 341/23 |
| 2012/0075192 A1* | 3/2012 | Marsden | G06F 3/04886 | 345/168 |
| 2012/0304063 A1* | 11/2012 | Weng | G06F 3/005 | 715/716 |
| 2013/0044053 A1* | 2/2013 | Galor | G06F 3/017 | 345/158 |
| 2013/0069883 A1* | 3/2013 | Oga | G06F 1/1615 | 345/172 |
| 2013/0176228 A1* | 7/2013 | Griffin | G06F 17/276 | 345/168 |
| 2013/0328769 A1* | 12/2013 | Jung | G06F 3/017 | 345/156 |
| 2014/0006997 A1* | 1/2014 | Kim | G06F 3/0488 | 715/773 |
| 2014/0028567 A1* | 1/2014 | Park | G06F 3/005 | 345/168 |
| 2014/0029789 A1* | 1/2014 | DeLean | G06K 9/20 | 382/103 |
| 2014/0062875 A1* | 3/2014 | Rafey | G06F 17/276 | 345/158 |
| 2014/0104177 A1* | 4/2014 | Ouyang | G06F 3/04883 | 345/168 |
| 2014/0105455 A1* | 4/2014 | Murase | G06F 3/0426 | 382/103 |
| 2014/0152566 A1* | 6/2014 | Safer | G06F 3/0213 | 345/163 |
| 2015/0121287 A1* | 4/2015 | Fermon | G06F 3/016 | 715/773 |
| 2015/0220149 A1* | 8/2015 | Plagemann | G06F 3/017 | 715/856 |
| 2015/0220150 A1* | 8/2015 | Plagemann | G06F 3/017 | 715/856 |
| 2015/0317069 A1* | 11/2015 | Clements | G06F 3/0237 | 715/773 |

* cited by examiner

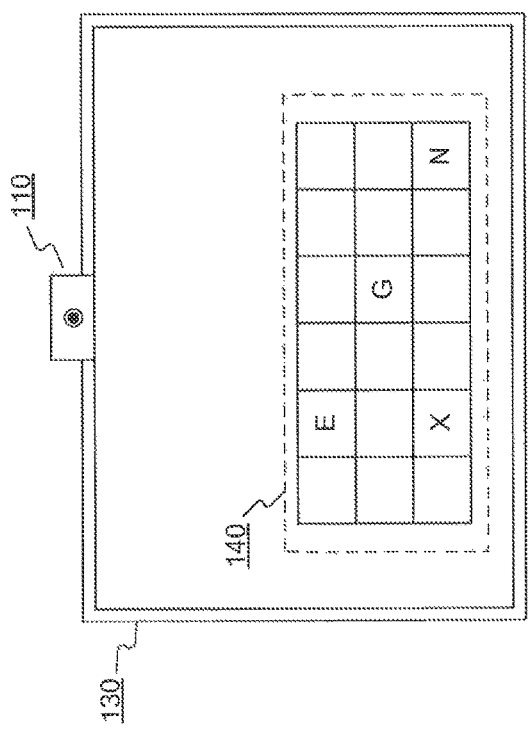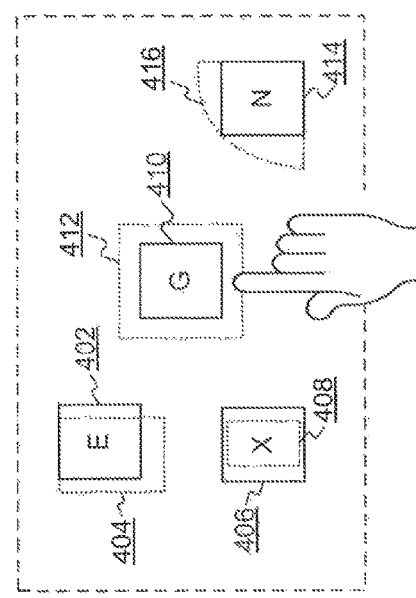
Fig. 4

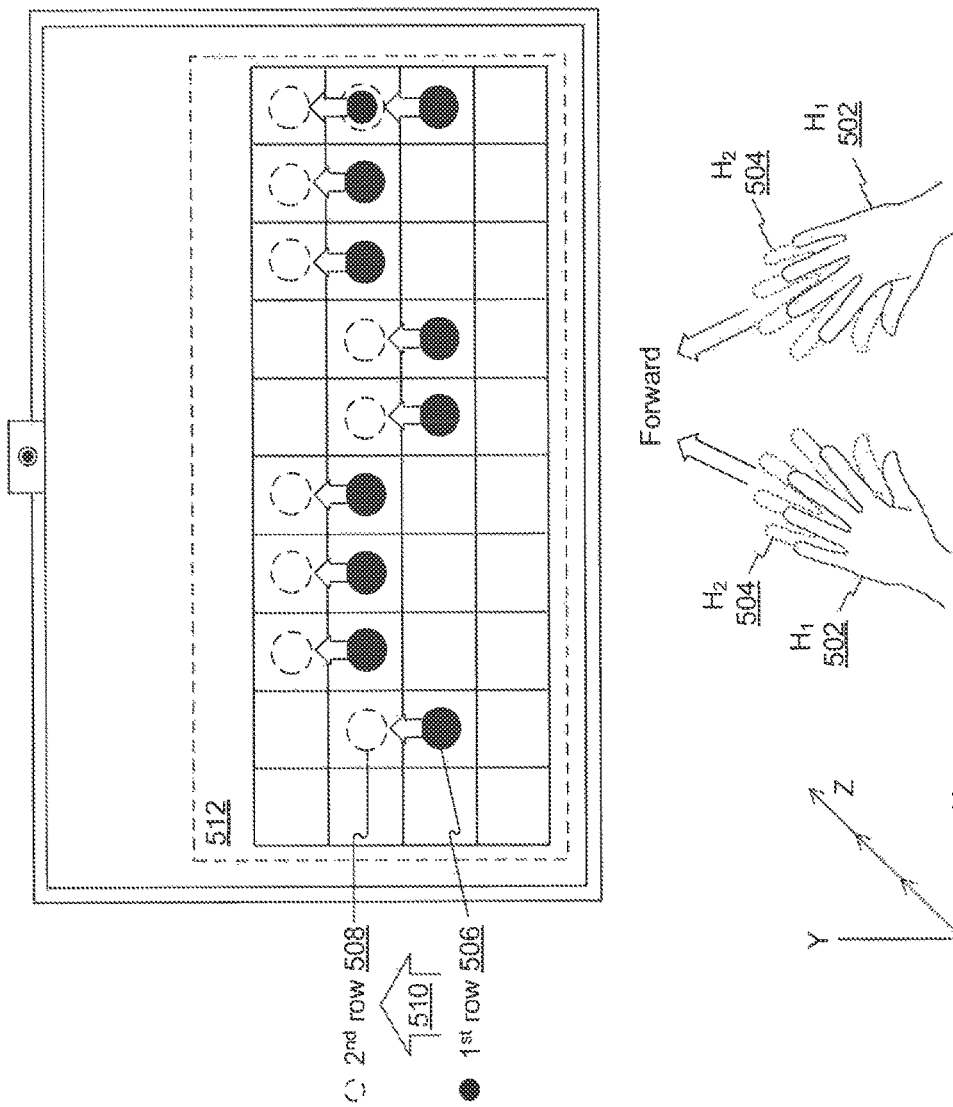

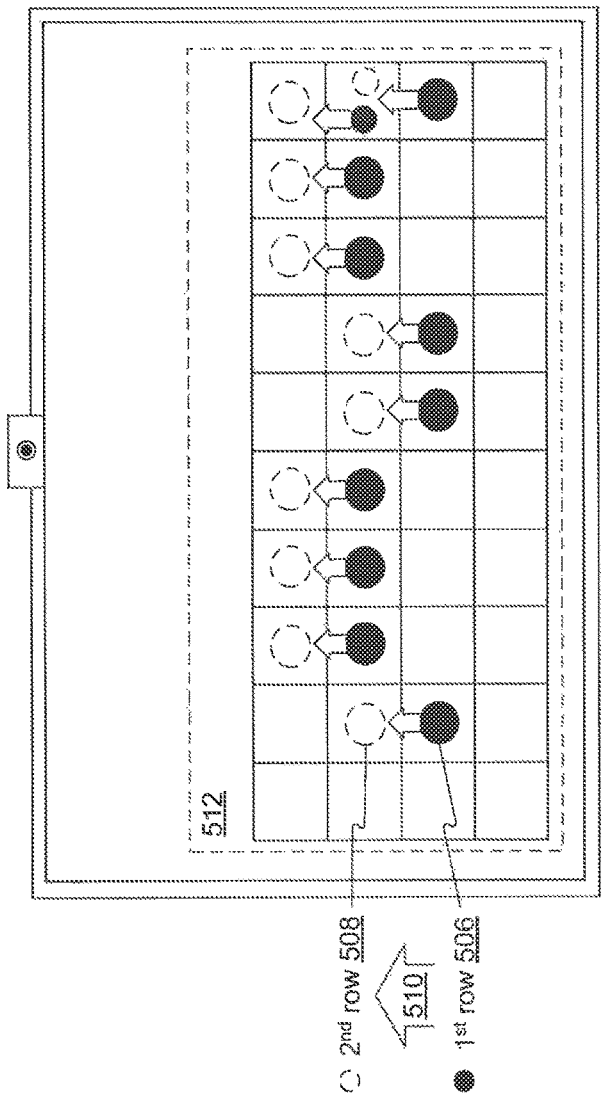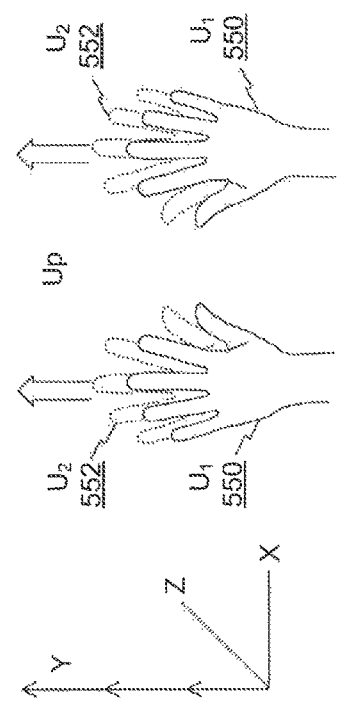
Fig. 5B

SYSTEMS, DEVICES, AND METHODS FOR TOUCH-FREE TYPING

RELATED APPLICATION

This application claims priority to U.S. Provisional Application No. 61/889,348, filed Oct. 10, 2013, which is incorporated herein by reference in its entirety.

TECHNICAL FIELD

The present disclosure relates to touch-free data entry such as typing and, more particularly, devices and computer-readable media for using one or more sensors to detect touch-free data entry.

BACKGROUND

Permitting a user to interact with a device or an application running on a device is useful in many different settings. For example, electronic systems include devices (e.g., keyboards, mice, and joysticks) to enable a user to input and manipulate data, and cause the system to execute a variety of other actions. Increasingly, however, touch-based input devices, such as keyboards, mice, and joysticks, are being replaced by, or supplemented with, devices that permit touch-free user interaction. For example, a system may include an image sensor to capture images of a user, including, for example, a user's hands and/or fingers. The device may include a processor that is configured to receive such images and initiate actions based on touch-free gestures performed by the user's hands and fingers.

Touch-free systems generally detect large movements of the entire hand, but these systems lack sufficient accuracy and precision to enable data input capabilities that rival the usage of physical computer peripherals. For example, these systems cannot detect subtle movements and gestures to fully simulate typing on a keyboard. Improvements in techniques for touch-free typing and data entry are desirable to provide a better and more accurate user experience.

SUMMARY

In one disclosed embodiment, a non-transitory computer readable medium is disclosed, having stored thereon it that may be executed by at least one processor to perform operations for touch-free data input such as typing. The operations may include displaying an image of a keyboard including a plurality of keys, receiving sensor data from at least one sensor of a user's hand spaced a distance from the displayed keyboard and in non-contact with the displayed keyboard image, tracking, based on the received images, one or more fingers of the user's hand in air a distance from the displayed keyboard image correlating locations of the one or more fingers in the air with images of the plurality of keys, and selecting keys from the image of the keyboard based on the correlated locations of the one or more fingers in the air, and a detection of a predefined gesture performed by the user.

In another disclosed embodiment, a data input device is disclosed. The data input device includes at least one processor configured to display an image of a keyboard, the displayed keyboard image including a plurality of keys, receive, from at least one sensor, sensor data of a user's hand spaced a distance from the displayed keyboard and in non-contact with the displayed keyboard image, track, based on the received sensor data one or more fingers of the user's hand in air a distance from the displayed keyboard image, correlate locations of the one or more fingers in the air with images of the plurality of keys, and select keys from the image of the keyboard based on the correlated locations of the one or more fingers in the air, and a detection of a predefined gesture performed by the user.

Additional aspects related to the disclosed embodiments will be set forth in part in the description which follows, and in part will be understood from the description, or may be learned by practice of the disclosed embodiments.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments, in the drawings:

FIG. 4 illustrates a graphical representation of key area sizes.

FIGS. 5A and 5B illustrate graphical representations of keyboard row selection.

DETAILED DESCRIPTION

The disclosed embodiments are directed to systems, devices, and methods for touch-free typing. In some embodiments, touch-free typing may include data entry into a computing device without physical contact between a user and the computing device or any peripherals connected to the computing device. That is, data may be entered into the computing device using information collected by one or more sensors for hand and/or finger movements detected in air. Using detection and analysis of individual hand and/or finger movements in air, accuracy of touch-free data entry can be facilitated, thus providing an efficient mechanism for entering data.

To facilitate sensor information collection for touch-free typing, a display device may display an image of a keyboard as a reference for a user making hand and finger movements in air that simulate typing or mouse manipulation. A processor may receive the collected sensor information via a wired or wireless connection with the sensor, and analyze the collected sensor information. Based on the analysis, the processor may distinguish between individual fingers and hands, and follow the movement of each finger and hand through air, to determine finger and hand positions at multiple points in time, thus tracking the hands and fingers in a three dimensional space. The processor may assign portions of the three dimensional space to keys in the displayed keyboard, and correlate the hand and finger positions with the assigned areas, to correlate individual fingers with keys in the displayed keyboard.

The processor may select one or more keys for data input when a predefined condition is satisfied while a finger remains correlated with a key. For example, when the finger makes a typing movement, such as a generally downward motion of a fingertip, the processor may determine that the user intends to enter data associated with the correlated key, and select the key for data input.

As described in further detail below, the processor may modify areas in space assigned to keyboard keys, and analyze detected hand and finger movement, poses, gestures, and orientations, to improve the efficiency and accuracy of touch-free typing, and thus improve the processor's functionality in recognizing data input and selecting intended keys.

Reference will now be made in detail to the example embodiments, which are illustrated in the accompanying drawings. Wherever possible, the same reference numbers will be used throughout the drawings to refer to the same or like parts.

Inventive embodiments may include a data input system having one or more components, such as a data input device, configured to receive data input via touch-free gestures. Other inventive embodiments may include a non-transitory computer readable medium comprising instructions that, when executed by at least one processor, cause the at least one processor to perform operations for receiving data input via touch-free gestures.

Figure 1A:
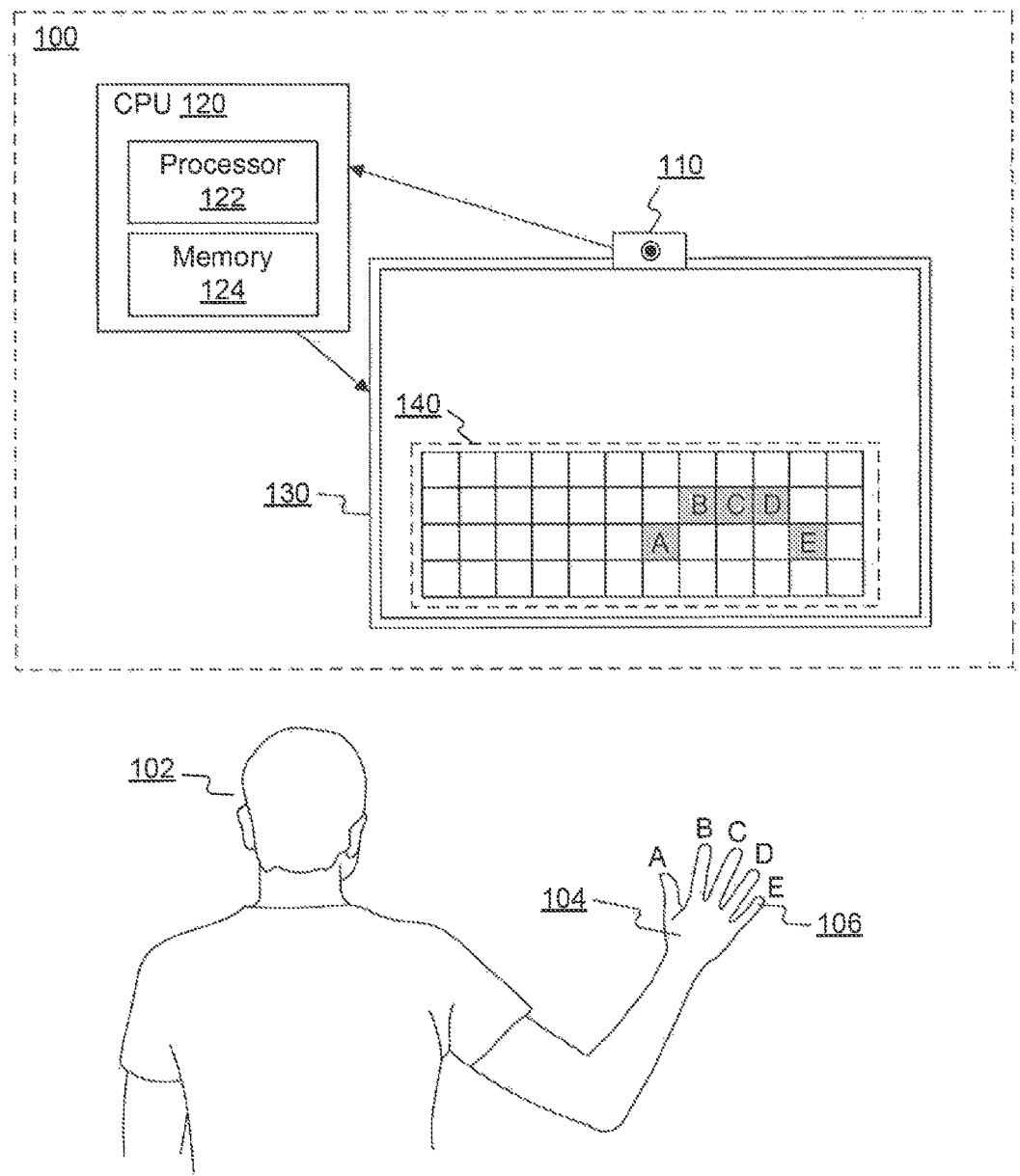
FIG. 1A illustrates an example system for implementing the disclosed embodiments.

FIG. 1A is a diagram illustrating one example of a data input system 100 that may implement the disclosed embodiments. System 100 may detect touch-free gestures, poses, and movement from one or more finger(s) 106 and/or one or both hand(s) 104 of a user 102. As shown in FIG. 1A, system 100 may include at least one sensor 110, a CPU 120, and a display 130. These components of system 100 may be communicatively coupled via one or more wired or wireless communication links.

Sensor 110 may be configured to collect information regarding activity in space proximate to sensor 110. In some embodiments, sensor 110 may include, for example, one or more of a camera, a light sensor, an infrared (IR) sensor, an ultrasonic sensor, a proximity sensor, a CMOS image sensor, a shortwave infrared (SWIR) image sensor, a reflectivity sensor, a single photosensor or 1-D line sensor capable of scanning an area, a 2-D sensor, a stereoscopic sensor that includes, for example, a plurality of 2-D image sensors, a depth sensor, a microphone, a movement sensor such as an accelerometer, a location sensor such as a GPS receiver, or an eye gaze tracker. Sensor 110 may be associated with a lens for focusing a particular area of light onto sensor 110.

Sensor 110 may be positioned adjacent to display 130 and obtain images of a three-dimensional viewing space. As depicted in FIG. 1A, user 102 is situated in the viewing space and thus appears in sensor data obtained by sensor 110 such as image data. The output of sensor 110 can be for example a 2D (two dimensional) color or infrared (IR) video. Alternatively, sensor 110 may be a depth video system comprising an image sensor or two 2D stereoscopic image sensors. Sensor 110 may comprise a combination of some or all of the above mentioned sensor types.

Images captured by sensor 110 may be digitized by sensor 110 and input to processor 122 of CPU 120, or may be input to processor 122 in analog form and digitized by processor 122. Exemplary proximity sensors may include, among other things, one or more of a capacitive sensor, a capacitive displacement sensor, a laser rangefinder, a sensor that uses time-of-flight (TOF) technology, an IR sensor, a sensor that detects magnetic distortion, or any other sensor that is capable of generating information indicative of the presence of an object in proximity to the proximity sensor. In some embodiments, the information generated by a proximity sensor may include a distance of the object to the proximity sensor. A proximity sensor may be a single sensor or may be a set of sensors. Although a single sensor 110 is illustrated in FIG. 1A, system 100 may include multiple types of sensors 110 and/or multiple sensors 110 of the same type. For example, multiple sensors 110 may be disposed within a single device such as a data input device housing all components of system 100, in a single device external to other components of system 100, or in various other configurations having at least one external sensor 110 and at least one sensor 110 built into another component (e.g., CPU 120 or display 130) of system 100.

In some embodiments, CPU 120 may include at least one processor 122 and a memory 124. CPU 120 may be incorporated in a data input device including, among other things, a mobile phone, smart-glasses, a personal computer (PC), an entertainment device, a set top box, a television, a mobile game machine, a tablet computer, an e-reader, a portable game console, a portable computer such as a laptop or ultrabook, a home appliance such as a kitchen appliance, a communication device, an air conditioning thermostat, a docking station, a game machine such as a mobile video gaming device, a digital camera, a watch, an entertainment device, speakers, a Smart Home device, a media player or media system, a location-based device, a pico projector or an embedded projector, a medical device such as a medical display device, a vehicle, an in-car/in-air infotainment system, a navigation system, a wearable device, an augmented reality-enabled device, wearable goggles, a robot, interactive digital signage, a digital kiosk, a vending machine, an automated teller machine (ATM), or any other apparatus that may receive data from a user or output data to a user. Moreover, the data input device containing CPU 120 may be handheld (e.g., held by a user's hand) or non-handheld.

CPU 120 may be connected to sensor 110 via one or more wired or wireless communication links, and may receive data from sensor 110 such as images, or any data capable of being collected by sensor 110. In some embodiments, CPU 120 may receive data from a plurality of sensors 110 via one or more wired or wireless communication links. CPU 120 may also be connected to display 130, and may send instructions to display 130 for displaying one or more images, such as keyboard image 140. Although illustrated in FIG. 1A as separate components, in some embodiments, sensor 110, CPU 120, and display 130 may be incorporated within a single data input device, or in two devices having various combinations of sensor 110, CPU 120, and display 130.

As used herein, processor 122 may include, among other things, any electric circuit or non-electric biological circuit that may be configured to perform a logic operation on at least one input variable, including, for example one or more integrated circuits, microchips, microcontrollers, and microprocessors, which may be all or part of a central processing unit (CPU), a digital signal processor (DSP), a field programmable gate array (FPGA), a graphical processing unit (CPU), or any other circuit known to those skilled in the art that may be suitable for executing instructions or performing logic operations. Processor 122 may include, for example, one or more of a general purpose processor, a DSP (digital signaling processor), a GPU (graphical processing unit), or any other device configured to run one or more software programs or otherwise execute instructions. Alternatively processor 122 may be a dedicated hardware, an application-specific integrated circuit (ASIC). As yet another alternative, processor 122 may be a combination of a dedicated hardware, an application-specific integrated circuit (ASIC), and any one or more of a general purpose processor, a DSP (digital signaling processor), a GPU (graphical processing unit). Although one processor is shown in FIG. 1A, system 100 may include a plurality of processors, which may provide different processing capabilities (e.g., dedicated graphics processing) and/or that may provide parallel processing functionality. Multiple functions may be accomplished using a single processor or multiple related and/or unrelated functions may be divided among multiple processors.

In some embodiments, memory 124 may include, for example, persistent memory, ROM, EEPROM, EAROM, flash memory devices, magnetic disks, magneto optical disks, CD-ROM, DVD-ROM, Blu-ray, non-electrical biological memory and the like, and may contain instructions (i.e., software or firmware) or other data. By way of example, FIG. 1A depicts memory 124 connected to processor 122. Generally, processor 122 may receive instructions and data stored by memory 124. Thus, in some embodiments, processor 122 executes the software or firmware to perform functions by operating on input data and generating output. However, processor 122 may also be, for example, dedicated hardware or an application-specific integrated circuit (ASIC) that performs processes by operating on input data and generating output. Processor 122 may be any combination of dedicated hardware, one or more ASICs, one or more general purpose processors, one or more DSPs, one or more GPUs, or one or more other processors capable of processing digital information. FIG. 1A depicts memory 124 as part of CPU 120. However, in alternative embodiments, memory 124 may be external to CPU 120. In some embodiments, information captured by sensor 110 may be stored in memory 124 to be processed on a later occasion, or may be processed by processor 122 immediately after capture and without storage in memory 124.

Embodiments may also include a display 130. Display 130 may include, for example, one or more of a television set, computer monitor, head-mounted display, broadcast reference monitor, a liquid crystal display (LCD) screen, a light-emitting diode (LED) based display, an LED-backlit LCD display, a cathode ray tube (CRT) display, an electroluminescent (ELD) display, an electronic paper/ink display, a plasma display panel, an organic light-emitting diode (OLED) display, Thin-film transistor display (TFT), High-Performance Addressing display (HPA), a surface-conduction electron-emitter display, a quantum dot display, an interferometric modulator display, a swept-volume display, Carbon nanotubes, a variforcal mirror display, an emissive volume display, a laser display, a holographic display, a light field display, a projector and surface upon which images are projected, including projection directly onto an eye retina, including an implanted artificial eye retina, of user 102, or any other electronic device for outputting visual information and/or creating a perception of user 102 of a presentation of visual information.

As discussed above, display 130 may receive and execute instructions from CPU 120 to display one or more images such as a keyboard image 140. Keyboard image 140 may include a graphic illustration of one or more "keys," shapes or icons representing different data inputs or computer functions. Keys may represent alphanumeric characters including symbols and emoticons input to processor 122 in response to selection of the appropriate key, or functions performed by processor 122 in response to selection of the appropriate key. In some embodiments, keyboard image 140 may include an image of a keyboard arranged in a grid pattern, or in an arrangement that suits the needs of user 102.

In some embodiments, keyboard image 140 may include one or more images of a QWERTY keyboard, a numeric keypad, function keys, media controls, and any other types of keys necessary based on the data input and functionality needs of user 102.

Figure 1B:
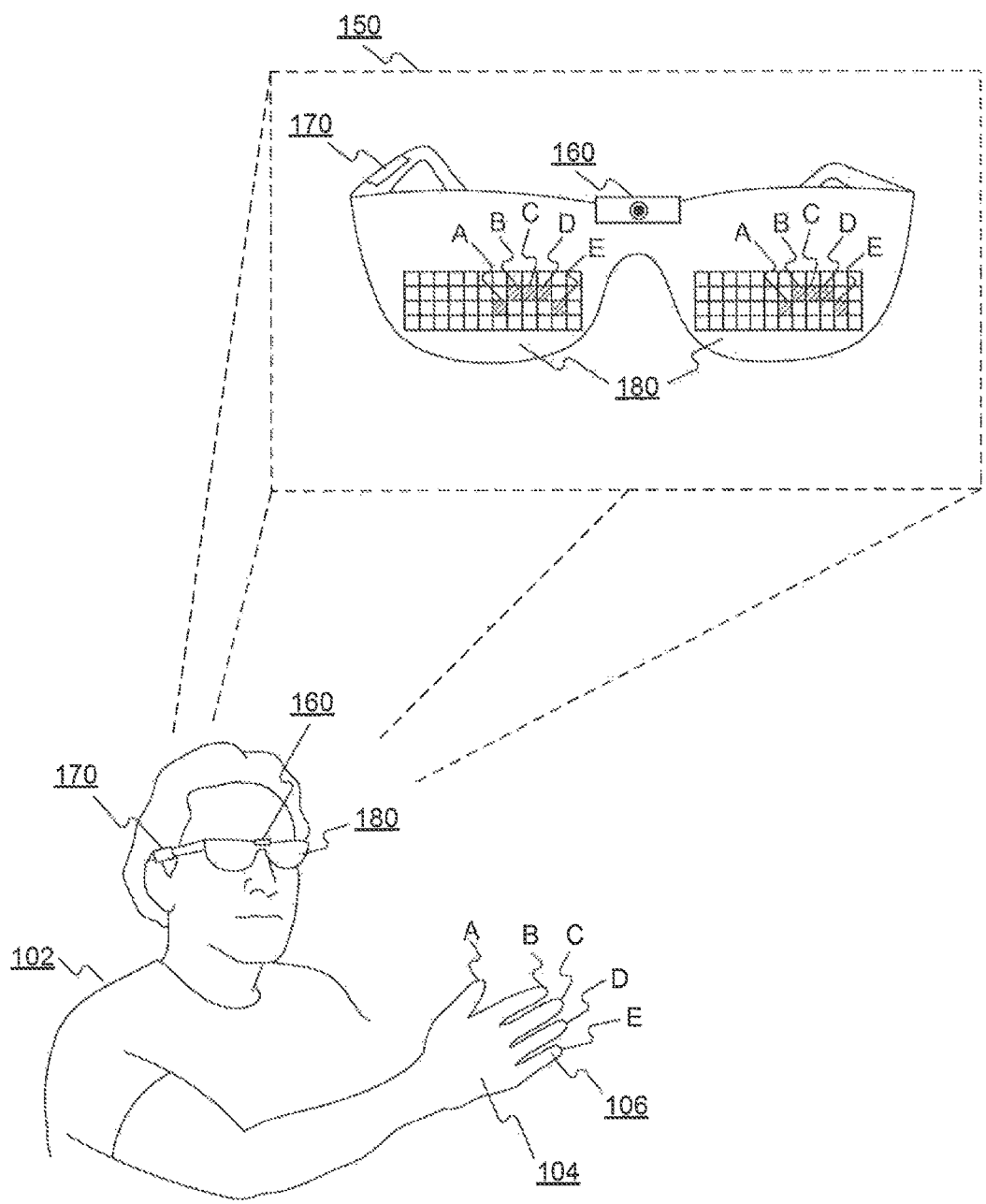
FIG. 1B illustrates another example system for implementing the disclosed embodiments.

FIG. 1B is a diagram illustrating another example of a system that may be used for implementing the disclosed embodiments, using detected touch-free gestures, poses, and movement from one or more finger(s) 106 and/or one or both hand(s) 104 of a user 102. FIG. 1B depicts system 100 embodied within a wearable device 150. As shown, device 150 may include one or more sensors 160, a CPU 170, and one or more displays 180. Although device 150 is shown as a pair of glasses worn on a head of user 102, device 150 may take other forms configured to be worn by user 102 (e.g., attached to an article of clothing) that is capable of presenting visual content such as keyboard image 140 to user 102. For the purposes of the following discussion, device 150 is described as the glasses shown in FIG. 1B. Furthermore, components common to portable devices (e.g., a battery) are not described in detail herein.

Sensor 160 may include any one or more of the sensor types and configurations described above with respect to sensor 110 in FIG. 1A. Particular to the body-worn configuration illustrated in FIG. 1B, sensor 160 may be disposed in the center of device 150, on the sides of device 150, on one or more device 150 corners, or any other location on device 150 suitable for sensor 160 placement, depending on the type of sensor 160. In some embodiments, multiple sensors 160 may be disposed on device 150.

CPU 170 may include similar components as those discussed above with respect to CPU 120 in FIG. 1A, such as processor 122 and memory 124. For example, in the body-worn configuration illustrated in FIG. 1B, CPU 170 may be disposed on or within the eyeglass frame of device 150. In some embodiments, CPU 170 may be an external device in wired or wireless communication with device 150.

Device 150 may include one or more display 180, such as a display 180 on one or both eyeglass lenses of device 150. Display 180 may include any appropriate display types similar to those discussed above with respect to display 130 in FIG. 1A that are compatible with a wearable device. In some embodiments, display 180 may comprise a projector that projects an image directly onto a pupil of an eye of user 102. In other embodiments, display 180 may display an image on or in front of one or both lenses in device 150, to create an augmented-reality illusion such that user 102 perceives the displayed image as floating in air in front of user 102.

Figure 2:
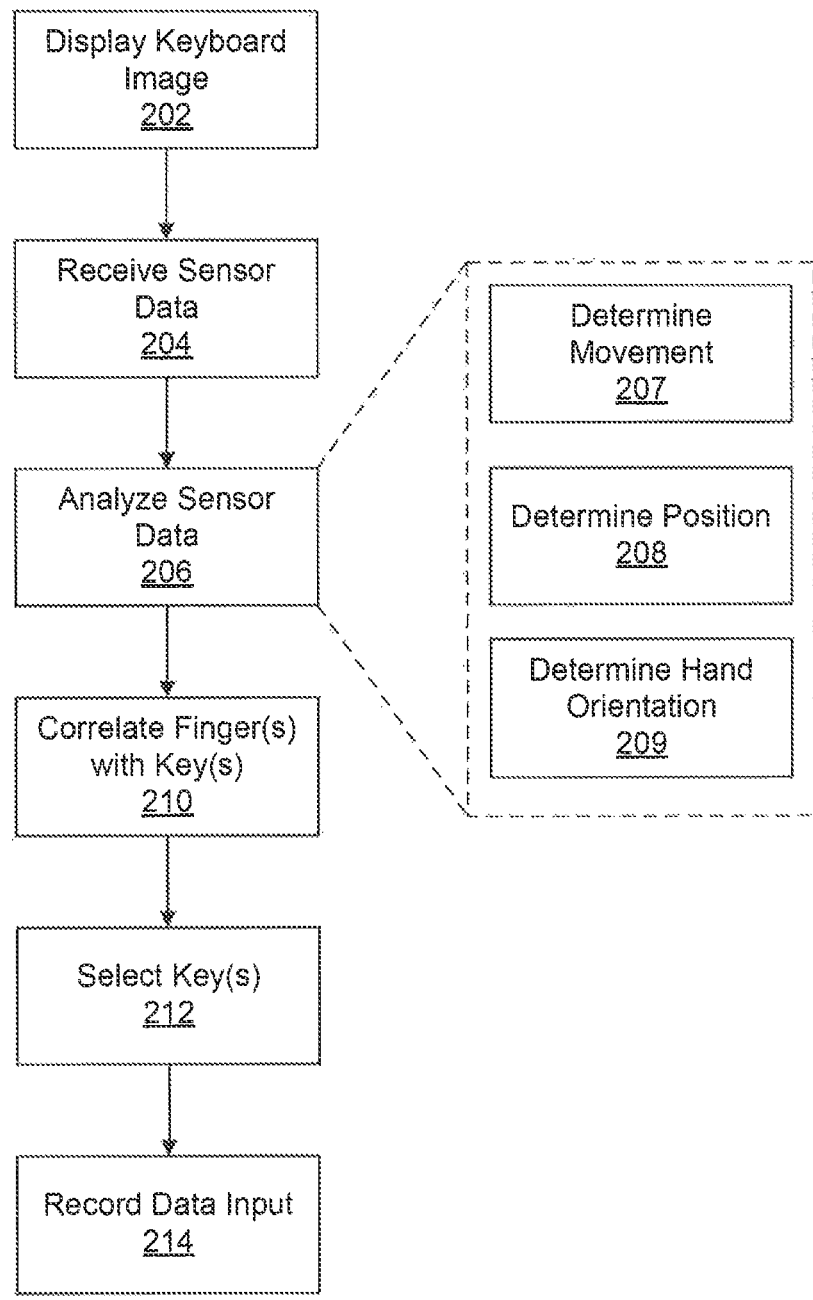
FIG. 2 illustrates an example process in accordance with some of the disclosed embodiments.

FIG. 2 illustrates an example process 200 for touch-free data input in accordance with some of the disclosed embodiments. In some embodiments, process 200 may use a detected typing motion to trigger the selection of keys displayed on a virtual keyboard. The detected typing motion may include user 102 moving his or her fingers 106 in the air to trigger the selection of the keys while the virtual keyboard is located a distance from fingers 106 of user 102. That is, the detected typing motion involves movements in air that do not contact a surface on which the virtual keyboard is displayed or projected. Process 200 is described herein as performed by sensor 110, processor 122 of CPU 120, and display 130, but in some embodiments some steps of process 200 may be performed by processing device other than processor 122 of CPU 120. Furthermore, in some embodiments one or more steps may be performed using a distributed computing system including multiple processors, such as processor 122 performing at least one step of process 200, and another processor in a networked device such as a mobile phone performing at least one step of process 200. Furthermore, in some embodiments one or more steps of process 200 may be performed using a cloud computing system.

In step 202, processor 122 may instruct a device such as display 130 to display an image of a keyboard. Display 130 may respond by displaying an image of a keyboard, such as keyboard image 140. The displayed image may include a plurality of keys. Keyboard image 140 may be displayed on a physical display device such as an LCD screen, projected directly onto user 102's eye, displayed in air and separated from any physical device or surface such as by use of hologram technology, or displayed using any other suitable display technique.

In step 204, processor 122 may receive sensor data collected by sensor 110, including data from one or more sensor 110 types discussed above. In some embodiments, processor may be configured to perform an operation including receiving, from at least one sensor, sensor data of a user's hand spaced a distance from the displayed keyboard, the user's hand being in non-contact with the displayed keyboard image. For example, sensor data may include images of user 102's hand 104 and fingers 106 spaced at a distance from keyboard image 140, and in non-contact with the displayed keyboard image 140. Images may include one or more of an analog image captured by sensor 110, a digital image captured or determined by sensor 110, a subset of the digital or analog image captured by sensor 110, digital information further processed by processor 122, a mathematical representation or transformation of information associated with data sensed by sensor 110, information presented as visual information such as frequency data representing the image, conceptual information such as presence of objects in the field of view of the sensor. Images may also include information indicative the state of the sensor and or its parameters during capturing images e.g. exposure, frame rate, resolution of the image, color bit resolution, depth resolution, field of view of sensor 110, including information from other sensor during capturing image, e.g. proximity sensor information, accelerator information, information describing further processing that took place further to capture the image, illumination condition during capturing images, features extracted from a digital image by sensor 110, or any other information associated with sensor data sensed by sensor 110. Moreover, "images" may include information associated with static images, motion images (i.e., video), or any other visual-based data. In some embodiments, sensor data received from one or more sensor 110 may include motion data, GPS location coordinates and/or direction vectors, eye gaze information, sound data, and any data types measurable by different sensor 110 types. In some embodiments, sensor data may include metrics obtained by analyzing combinations of data from two or more sensors 110.

In step 206, processor 122 may analyze received sensor data to recognize movements, poses, and gestures associated with touch-free typing and data input. In some embodiments, the processor may be further configured to perform operations including tracking, based on the received images, one or more fingers of the user's hand in air a distance from the displayed keyboard image. In some embodiments, processor 122 may analyze the sensor data by using one or more known data analysis methods such as image analysis and motion tracking of objects in a three-dimensional space based on a time-ordered received sensor data, such as a sequence of images. Processor 122 may compare the sensor data to a database of predetermined movements, gestures, orientations, and poses stored in, for example, memory 124. Step 206 may include one or more of determining and tracking object movement in the sensor data (step 207), determining a position and/or change of position of one or more hand 104 and/or one or more finger 106 in the sensor data (step 208), or determining a hand orientation (step 209). Steps 207, 208, and 209 may include identifying individual hands 104 and fingers 106 of user 102 in the received sensor data, and tracking the movement, position, and orientations of the identified objects in a time-ordered sequence of received sensor data. As an example, processor 122 may receive image data from sensor 110 of user 102's hand 104, including five fingers 106 identified by processor 122 as fingers "A," "B," "C," "D," and "E," as illustrated in FIG. 1A. Processor 122 may determine at least one of the changes in movement, position, and orientation for some or all of fingers A-E, and of user 102's hand 104, in real-time as sensor 110 captures data such as image data, in order to track one or more hands 104 and one or more fingers 106 in air at a distance from the displayed keyboard image. In some embodiments, the determined changes may include changes in a two-dimensional plane, using a sensor such as a 2D camera. In some embodiments, the determined changes may include changes in a three-dimensional space, using a single sensor 110 such as a 3D camera, or a combination of sensors 110 such as a 2D camera in combination with a depth sensor, or image sensor and proximity sensor, or image sensor and "time of flight" based proximity sensor, or stereoscopic cameras or any system including one or more sensors from which the locations of the user's hand finger, fingertips in the 3D space can be extracted.

"Movement" as used herein may include one or more of a three-dimensional path through space, speed, acceleration, angular velocity, movement path, and other known characteristics of a change in physical position or location of user 102's hands 104 and fingers 106.

"Position" as used herein may include a location within one or more dimensions in a three dimensional space, such as the X, Y, and Z axis coordinates of an object relative to the location of sensor 110. Position may also include a location or distance relative to another object detected in sensor data received from sensor 110, such as the location of finger "B" relative to the location of finger "A," in the example illustrated in FIG. 1A. In some embodiments, position may also include a location of one or more hands 104 and/or fingers 106 relative to user 102's body, indicative of a posture of user 102.

"Orientation" as used herein may include an arrangement of one or more hands 104 or one or more fingers 106, including a position or a direction in which the hand(s) 104 or finger(s) 106 are pointing. In some embodiments, an "orientation" may involve a position or direction of a detected object relative to another detected object, relative to a field of detection of sensor 110, or relative to a field of detection of the displayed device or displayed content.

A "pose" as used herein may include an arrangement of a hand 104 and/or one or more fingers 106, determined at a fixed point in time and in a predetermined arrangement in which the hand 104 and/or one or more fingers 106 are positioned relative to one another. In some embodiments, an example hand 104 pose may include open hands with fingers 106 spread, such as in an arrangement for typing on a keyboard. Another exemplary hand pose may include a generally closed hand, with one or two fingers extended, such as in an arrangement for manipulating a computer mouse. Other exemplary hand poses may include, far example, a generally downward-facing open hand with two or more fingers spaced apart as if placed on a physical keyboard, and a downward-facing hand with two or more fingers generally curled, as if placed on a physical computer mouse.

A "gesture" as used herein may include a detected/recognized predefined pattern of movement detected using sensor data received from sensor 110. As used herein, "using sensor data" may include analysis of raw sensor data received from sensor 110 and/or analysis of one or more metrics derived from raw sensor data. In some embodiments, gestures may include predefined gestures corresponding to the recognized predefined pattern of movement. The predefined gestures may involve a pattern of movement indicative of manipulating an activatable object, such as typing a keyboard key, clicking a mouse button, or moving a mouse housing. As used herein, an "activatable object" may include any displayed visual representation that, when selected or manipulated, results in data input or performance of a function. In some embodiments, a visual representation may include displayed image item or portion of a displayed image such as keyboard image 140, a virtual key, a virtual button, a virtual icon, a virtual knob, a virtual switch, and a virtual slider.

A predefined gesture may be for example, a swiping motion over the activatable object, performing a pinching motion of two fingers, or pointing towards the activatable object, a left to right gesture, a right to left gesture, an upwards gesture, a downwards gesture, a pushing gesture, opening a clenched fist, opening a clenched first and moving towards the sensor (also known as a "blast" gesture"), a tapping gesture, a pushing gesture, a waving gesture, a clapping gesture, a reverse clapping gesture, closing a hand into a fist, a pinching gesture, and a reverse pinching gesture, a gesture of splaying fingers on a hand, a reverse gesture of splaying fingers on a hand, pointing at an activatable object, holding an activating object at an activatable object for a predetermined amount of time, clicking on the activatable object, double clicking, clicking from the right side, clicking from the left side, clicking from the bottom, clicking from the top, grasping the object, gesturing towards the object from the right, or from the left side, passing through the object, pushing the object, clapping over the object, waving over the object, performing a blast gesture, performing a tipping gesture, performing a clockwise or counter clockwise gesture over the object grasping the activatable object with two fingers, performing a click-drag-release motion, or sliding an icon such as a volume bar. The speed of a scrolling command can depend up, the speed or acceleration of a scrolling motion. Two or more activatable objects may be activated simultaneously using different activating objects, such as different hands or fingers, or simultaneously using different gestures.

Referring again to FIG. 2, in step 210, processor 122 may use the determined movement, position(s), and orientation(s) to correlate one or more detected fingers 106 with one or more keys in the displayed keyboard image 140. In some embodiments, the processor may be further configured to perform operations including correlating locations of the one or more fingers in the air with images of the plurality of keys. Notably, the correlation between fingers 106 and keyboard image 140 keys is performed based on sensor data associated with the fingers 106 in air, and does not require any indication of fingers 106 touching keyboard image 140 for processor 122 to correlate fingers 106 to keyboard image 140 keys in step 210. In the example illustrated in FIG. 1A, fingers A-E are correlated with five keys in keyboard image 140, labeled keys A-E. Note that keys A-E in FIG. 1A are not keys for inputting the alphanumeric characters "A," "B," "C," etc., but instead are keys that processor 122 indicates correspond to fingers labeled A-E based on the detected movement, position/location, and/or orientation of fingers A-E in air.

Referring again to FIG. 2, in step 212, processor 122 may select one or more keys in keyboard image 140, based on the correlated locations of the one or more fingers 106 in the air, and when a predefined condition is net while the one or more fingers 106 remain correlated with the one or more keys. In some embodiments, the processor may be further configured to perform operations including selecting keys from the image of the keyboard based on the correlated locations of the one or more fingers in the air, and a detection of a predefined gesture performed by the user, where the predefined gesture may correspond to the predefined condition. The predefined condition can be for example, predefined period of time during which a finger 106 remains correlated with a particular key and/or detection of a predefined gesture performed by the finger 106, detection of a finger 106 moving over a particular key, and changing movement direction while over the particular key, or changing movement direction in association with a particular key, or detection of a gesture that indicates a beginning of a word, an end of a word, or associating a space between words indicating an end of a word, or any other predefined suitable condition. For example, processor 122 may detect movement of one or more fingers 106 over keys on keyboard image 140 to write a word, and detect a "taping" gesture performed by the thumb as "space" after a word, which also indicates the end of the word. With the use of motion features and gestures detected in received sensor data, processor 122 can accurately and quickly enter touch-free typing data without the need for physical contact with a device and/or touchscreen.

In some embodiments, processor 122 may select one or more keys in keyboard image 140 by detecting a motion path of a hand 104 and/or finger 106 in received sensor data and determine a sequence of hand 104 and/or finger 106 locations on the keyboard image 140 based on the detected motion path. Processor 122 may associate the detected motion path and/or determined sequence of locations with one or more words based on factors such as, for example, a sequence of corresponding characters associated with keys on keyboard image 140, linguistic information such as a database of words or phrases, statistical data regarding common words and/or phrases, and/or statistical learning data collected by processor 122 for user 102 over time including frequent motion paths particular to user 102 and typing habits including frequent words, phrases, and typing errors associated with user 102 stored in memory 124.

As another example, in some embodiments, a predefined condition may include detection of a finger 106 positioned in a location in 3D space for at least predefined time, such as a finger 106 "hovering" over a correlated key for 3 seconds. As another example, in some embodiments the predefined gesture may include a tapping motion towards the displayed keyboard image 140, indicative of a clicking or typing motion.

Once the predefined condition is met a respective command associated with the selected key is executed. In step 214, processor 122 may record data input corresponding to the selected one or more keys. The data input may include entry of alphanumeric characters such as letters, numbers, or symbols associated with the selected key(s), computer functions associated with the selected keys, or a combination of characters and functions. Repeating the steps of process 200 may allow the input of a plurality of characters and/or functions using touch-free data input, thus allowing for touch-free typing.

Keyboard Mode and Mouse Mode

In some embodiments, versions of keyboard image 140 may include a virtual mouse, similar in look and configuration to computer mouse peripherals known to those of ordinary skill in the art. However, the use of a virtual mouse in conjunction with a virtual keyboard presents certain challenges that must be overcome in a touch-free system. For example, when using a traditional physical keyboard and mouse, a user physically moves a hand between the keyboard and the mouse, to switch between entering data via the keyboard and manipulating the mouse to perform various operations. However, in touch free typing environments having a virtual keyboard and a virtual mouse, a physical keyboard or a physical mouse does not exist. To streamline the virtual switch from keyboard to mouse, in some embodiments a gesture may be recognized by processor 122 to determine that a hand 104 that is in one instant typing, in the next instant may be seamlessly used to control cursor movements. The processor may be further configured to display an image of a virtual mouse having one or more activatable mouse buttons and/or a virtual mouse cursor for selecting and "clicking" one or more icons or displayed objects, at a distance from the user, and detect at least one first hand pose and at least one second hand pose, or at least one first set of hand poses and at least one second set of hand poses. As used herein, the instant in which hand 104 is typing is referred to as "keyboard mode," and the instant in which hand 104 is manipulating a virtual mouse is referred to as "mouse mode." The processor may enable the keyboard mode for selection of at least one key from the displayed keyboard when the first hand pose is detected, and enable the mouse mode for manipulation of the virtual mouse when the second hand is detected. In some embodiments, the processor may enable the user to switch between the keyboard mode and the mouse mode by changing between the first hand pose and the second hand pose.

Figure 3:
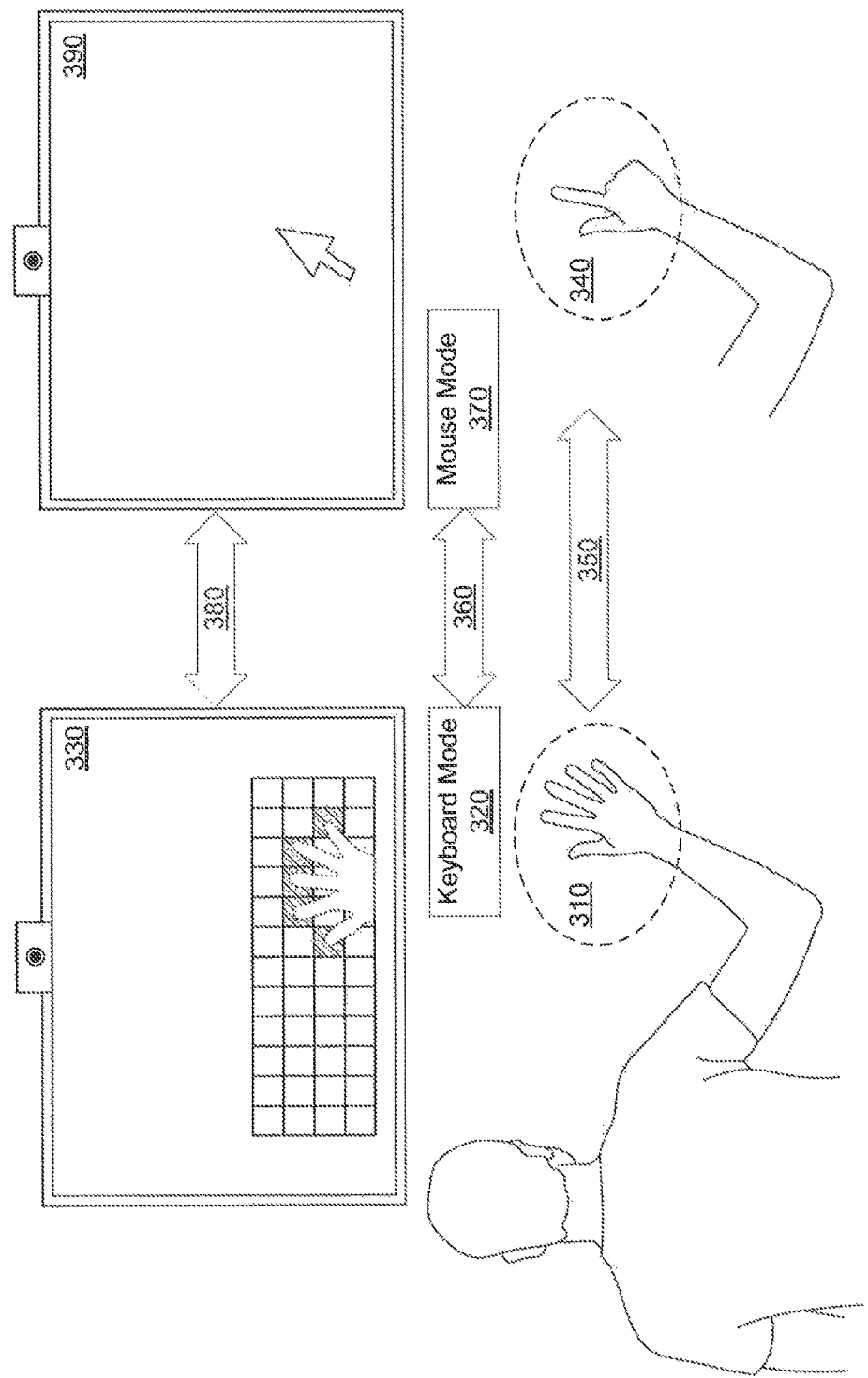
FIG. 3 illustrates graphical representations of a keyboard mode and a mouse mode in accordance with some of the disclosed embodiments.

FIG. 3 illustrates graphical representations of a keyboard mode and a mouse mode in accordance with some of the disclosed embodiments. As shown in FIG. 3, processor 122 may differentiate between a keyboard mode 320 and a mouse mode 370 by detecting different hand poses, such as first hand pose 310 and second hand pose 340. For example, when processor 122 analyzes received sensor data and determines that user 102 is forming first hand pose 310 by forming their hand 104 in a generally open hand with fingers 106 spread apart, then processor 122 may enter keyboard mode 320, and cause display 130 to display a keyboard in a keyboard mode interface 330. Processor 122 may continue processing received sensor data to select one or more keys from the displayed keyboard for data input based on detected gestures such as clicking or typing gestures. In some embodiments, display 130 may display an image of one or more virtual hands that corresponds to user 102's hands 104, to illustrate where user 102's hands 104 are positioned relative to keyboard image 140 in keyboard mode interface 330, to facilitate more accurate and enjoyable data entry. The displayed virtual hand(s) may move according to detected movement of user 102's hands 104, and indicate the positioning of individual fingers over particular keys. For example, the displayed virtual hand may illustrate positions of fingers 106 that are located "on top" of certain keys in keyboard image 140, by positioning virtual fingers on the virtual hand over the respective keys correlated with fingers 106. In some embodiments, keyboard image 140 may include any other suitable visual representation for illustrating one or more fingers 106 positioned "on top" of one or more keys, such as by highlighting one or more keys which correlate to one or more finger 106 locations.

If processor 122 detects that user 102 has changed their hand pose (transition 350) from first hand pose 310 to a second hand pose 340, for example by forming their hand 104 in a generally closed hand and/or a hand with one or more fingers 106 extended and generally pointed upward, then processor 122 may switch from keyboard mode 320 to mouse mode 370 (transition 360), thereby instructing display 130 to transition (380) from keyboard mode interface 330 to mouse mode interface 390, thereby displaying an image of a virtual mouse at a distance from user 102. In some embodiments, processor 122 may switch from keyboard mode 320 to mouse mode (transition 360) when processor 122 detects a change in orientation of one hand 104 relative to the other hand 104, such as when user 102 moves one hand 104 right/left/up/down while the other hand 104 remains in substantially the same position, indicative of manipulating a mouse with the moving hand 104 while the stationary hand 104 remains on the keyboard.

While in mouse mode 370, processor 122 may continue analyzing sensor data in real-time to manipulate the virtual mouse based on hand 104 and finger 106 movements and gestures, to move the virtual mouse or virtual cursor, to select one or more buttons on the virtual mouse, and/or click on one or more displayed activatable objects such as one or more displayed icons. Upon detecting user 102 switching back to the first hand pose 310, processor 122 may transition from mouse mode 370 back to keyboard mode 320 (reversing transition 360), and instruct display 130 to switch from mouse mode interface 390 back to keyboard mode interface 330 (reversing transition 380).

Key Area Sizing

On traditional physical keyboards, many keys are approximately the same size, which is practical for physical keyboards but presents problems with virtual keyboards and especially touch-free data input. In particular, uniform key sizes in virtual keyboards can lead to increased errors in hard-to-reach areas of the keyboard or in areas of more commonly used keys, since errors are sometimes made by selecting proximate keys rather than the intended key. In some embodiments, error rates can be reduced by modifying the spaces corresponding to some or all keyboard keys relative to other keys. In some embodiments, the processor may be configured to assign areas in space to alphanumeric keys on the keyboard, and the areas in space assigned to each key may vary in size depending on criteria including an expected frequency of key usage, and motion features of the user 102's hands 104 and fingers 106.

In some embodiments, processor 122 may assign and modify areas in space of different sizes to certain keys in keyboard image 140. For clarity, the displayed keyboard image 140 does not change appearance based on modified key area sizes. Instead, processor 122 may assign areas of various shapes and dimensions in the space within a field of view of sensor 110, around user 102's hand 104 and/or fingers 106. For example, in some embodiments the assigned areas may be arranged within a field of view of sensor 110 and associated with a location in space, such as a location in space where hands 104 first appear in the typing session, or a location of a last-typed key.

In some embodiments, processor 122 may dynamically modify one or more key area sizes based on a probability of a next key to be selected for one or more keys in keyboard image 140, even though the key sizes in keyboard image 140 displayed on display 130 remain static. Processor 122 may modify assigned key areas as a function of one or more factors including, for example, a likelihood that a certain key will be selected next, a selection frequency of a certain key, a predetermined difficulty of reaching a certain key, a risk of overshooting a key, detection of a finger hovering over a key, or a likelihood that a certain key will be selected next based on a word completion algorithm.

In some embodiments, processor 122 may assign areas in space to keys using historical data of touch-free typing activity for one or more users. In other embodiments, processor 122 may dynamically change key area sizes based on data of user 102's touch-tree typing activity collected with sensor 110. For example, in some embodiments, processor 122 may assign areas in space to alphanumeric keys on the keyboard, the areas in space varying in size depending on criteria including an expected frequency of key usage. As another example, in some embodiments, processor 122 may dynamically vary an area in space assigned to a particular key based on a prediction that the particular key will be selected next. As yet another example, in some embodiments, processor 122 may dynamically vary an area in space assigned to a particular key based on the particular key's location in the keyboard image, such as along the edge of the keyboard, at the corners of the keyboard, farther from the center of the keyboard, or other locations consider to be relatively difficult to reach when compared to keys placed proximate to common keyboard hand placement. As yet another example, in some embodiments, processor 122 may dynamically vary an area in space assigned to a particular key or set of keys based on a predetermined or observed error rate of typing. For example, processor 122 may increase one or more areas assigned to one or more keys may that are the subject of frequent typing errors such as mistakenly selecting a key next to a particular key or overshooting the particular key. In some embodiments, processor 122 may observe one or more error rates for particular keys using a frequency of manual typing corrections or using a word completion algorithm. In some embodiments, one or more error rates may be preprogrammed for one or more keys.

As shown in FIG. 4, keyboard image 140 may include a plurality of keys, such as the exemplary four keys corresponding to data input of alphabetical letters, including an "E" key, an "X" key, a "G" key, and a "N" key. FIG. 4 provides a comparison between unmodified versions of these keys and versions that have been modified to facilitate more accurate data input detection. As shown, a dotted line box around the illustrated hand shows an area in space, with portions of the area assigned to each of the four keys. Solid boxes for each of the four keys represent unmodified areas corresponding directly to the key sizes displayed in keyboard image 140, including E area 402, X area 406, G area 410, and N area 414. The dotted line boxes for each of the four keys represent modified areas of various sizes and shapes assigned to each of the four keys by processor 122, to facilitate more accurate data input detection. The modified assigned areas include modified E area 404, modified X area 408, modified G area 412, and modified N area 416.

In some embodiments, processor 122 may assign a modified area comprising a space that is offset from the original key space. For example, modified area 404 is offset to the left and below E area 402. This modification may result from, for example, a history of placing a finger in modified E area 404, with intent to select the E key via E area 402. Thus, to compensate for unintentional overshooting of a desired key (discussed in further detail below), processor 122 may generate an offset assigned area, such as modified E area 404. Additionally, in some embodiments the offset assigned area for a frequently selected key may be larger than the original key area, as illustrated by modified E area 404 being taller than E area 402.

In some embodiments, processor 122 may identify one or more keys which are selected less frequently, such as the X key shown in FIG. 4. X area 406 represents the unmodified area in space corresponding to the X key, and in some embodiments processor 122 may assign a smaller modified X area 408 which, when selected, triggers an input of the letter "X." Notably, modified X area 408 is smaller in all dimensions than X area 406, and therefore selection of the X key in this example would require a more deliberate and precise effort by user 102. Processor 122 may assign smaller modified areas to one or more of the less frequently used keys, and reassign portions of the original key areas to keys that require larger and/or offset areas.

In some embodiments, processor 122 may dynamically modify one or more assigned key areas as a function of a likelihood that certain keys will be selected next. For example, processor 122 may assign a larger area to a key that is deemed likely to be selected next, either without modifying surrounding key areas, or with modifications to surrounding key areas. However, in some embodiments, keyboard image 140 may remain unmodified, and only the invisible assigned areas in space are modified. Processor 122 may employ one or more methods to determine a likelihood of selecting a particular key next, such as determining that a hand or finger hovers over a particular key when a finger is still or has stopped moving over a key for a predetermined amount of time.

In some embodiments, processor 122 may assign an enlarged area to a key that has been historically selected more frequently than other keys. As illustrated in FIG. 4, modified G area 412 is larger in all dimensions than G area 410. By enlarging the area assigned to a more frequently selected key, data input accuracy is enhanced because there is a higher probability that a more frequently selected key is intended to be selected even when the user 102's finger 106 is located next to the key.

Depending on the shape and layout of the displayed keyboard, certain keys may be more difficult to reach than others. For example, when user 102's hands 104 are positioned near the center of the displayed keyboard, keys around the edges or corners of the keyboard may be less accessible and require a greater effort to reach and select. In some embodiments processor 122 may compensate for keys that are more difficult to reach by assigning larger areas to those keys. Furthermore, in some embodiments, processor 122 may alter the shape of the area(s) assigned to difficult to teach keys. As illustrated in FIG. 4, the N key is positioned in a lower right corner of the displayed keyboard and more difficult to reach than, for example, the displayed E, G, and X keys when user 102's hands 104 are positioned near the center of the displayed keyboard. Processor 122 may alter N area 414 assigned to the N key, to generate modified N area 416. As shown, modified N area 416 may be larger in size than N area 414, and may have a modified shape such as an angled or curved edge to facilitate easier key selection.

Determining Intended Keys

When moving one or more fingers in mid-air, it is often difficult for a user to control finger motion to stop precisely within the assigned area in space for the intended key. As a result, user 102's fingers 106 may overshoot the assigned space, which may result in typing errors. To avoid errors that result in overshooting, in some embodiments processor 122 may require the user 102 to hover finger 106 in the assigned area for the intended key, such as over or near the intended key in the displayed keyboard image for a predetermined period of time, to allow processor 122 to confirm the intended key.

To detect a hover, processor 122 may analyze information received from sensor 110 to detect a change in speed of the moving finger 106 and associate the change in speed with a hover gesture. Processor 122 may determine which key is associated with the hover. For example, processor 122 may use the determined position in space of finger 106 to determine a key that is associated with the area in space where finger 106 is hovering. In some embodiments, processor 122 may employ one or more algorithms to determine a likely intended key (e.g., an algorithm that specifies thresholds for determining whether a key is proximate to the position of a hovering gesture).

Furthermore, in touch-free typing systems, system lag may be present due to either a delay between sensor data capture and processing, or a delay in the time it takes a human brain to process the displayed images, such as images of a virtual hand moving across the displayed keyboard image 140 (as illustrated and discussed with respect to FIG. 3). During the system lag, the user may be led to believe that a finger needs to keep moving to reach a key or icon, when, in fact, additional movement will cause the finger to overshoot the key. This may cause the user to select the wrong keys. In some embodiments, processor 122 may account for system lag by determining the user's likely intent, and displaying intended motion rather than actual motion.

In some embodiments, processor 122 may predict a next key that will be selected by determining user 102's likely intent using one or more motion features of one or more hands 104 and/or one or more fingers 106 in the received sensor 110 information to avoid overshooting. For example, sensor 110 may analyze received images from sensor 110 and determine one or more motion features such as a motion vector, motion speed, speed changes, acceleration and deceleration during the motion with respect to one or more hands 104 and/or one or more fingers 106, a change in orientation of one or more hands 104 and/or one or more fingers 106, and/or motion speed or paths of one or more finger 106 tips relative to other finger 106 tips and/or relative to a center of hand 104.

In some embodiments, processor 122 may also determine a likely intent using one or more of a predetermined amount of estimated time for brain to process visual feedback, a predetermined or calculated amount of time for processor 122 to process received sensor 110 data such as received images, or a history of prior keys selected. For example, when a detected motion vector that is above a certain level or threshold such as when processor 122 detects movement of one or more fingers 106, processor 122 may cause display 130 to provide visual feedback to user 102, such as highlighting one or more keys on keyboard image 140 that correlate to finger 106 positions. Processor 122 may predict a likely key based on the motion vector, to identify a key that will probably be correlated in the immediate future (e.g. the next few milliseconds). Processor 122 may instruct display 130 to highlight the likely key before the finger 106 is actually positioned over the likely key, to account for system lags inherent in processing systems, and to account for any mental lag of the user 102. Mental lag may include, for example, a minor time delay between the time an image is displayed on display 130 and the time that user 102's mind recognizes and understands the displayed image. Mental lag may be present when user 102 views a virtual hand moving across keyboard image 140, but user 102's does not register the exact position of the virtual hand immediately, causing user 102 to overcompensate and possibly overshoot an intended key. By selecting and highlighting a likely key at a small (e.g. milliseconds) interval before hands 104 and fingers 106 reach the actual position of the likely key, the negative effects of system and mental lag may be minimized.

As another example, processor 122 may cause display 130 to display more than one highlighted key along a direction of the motion vector path so that user 102 perceives "reaching" an intended key before actually reaching it, and so that user 102 will stop moving the finger 106 to minimize overshooting the intended key. As an example, display 130 may highlight two keys along the detected motion path—a "current" key corresponding to the detected finger 106 position, and the likely next key. The timing of highlighting the intended key early may depend on multiple factors including the system lag and the delay in the time it takes a human brain to process the displayed images (i.e. mental lag), a detected speed, a motion vector, a probability of a key to be chosen, and user 102's "motion behavior," such as user 102's typing habits over time including common errors, commonly selected keys, and common motion features.

In some embodiments, processor 122 may learn the particular "motion behavior" for user 102 and provide visual feedback (e.g. highlights keys on the keyboard) using the information extracted from user "motion behavior" to avoid overshooting intended keys.

"Motion behavior" parameters may include, for example, an average distance of overshooting particular keys, and locations of overshooting in keyboard image 140. An overshooting distance may include an area in space added to a key area size of a likely next key, added in the direction of a detected motion vector. For example, if finger 106 is moving to the right toward a likely key, processor 122 may add an overshooting distance to the right of an area assigned to the likely key.

In some embodiments, processor 122 may determine overshooting distances based on, for example, a distance between a last key typed and a likely next key in a predicted word or phrase. For example, if processor 122 determines that user 102 is likely typing the word "time," processor 122 may calculate one or more overshooting distances between the "t," "i," "m," and "e" keys on keyboard image 140. If keyboard image 140 includes a standard QWERTY keyboard, processor 122 may calculate a first overshooting distance between the "t" and "i" keys based on the distance between the keys (3 keys apart), and/or user 102's historical accuracy in typing "i" after "t." Processor 122 may then calculate a second overshooting distance between the "i" and "m" keys based on the distance (2 keys apart) and/or user 102's historical accuracy in typing "m" after "i." Finally, processor 122 may calculate a third overshooting distance between the "m" and "e" keys based on the distance (4 keys diagonally apart) and/or user 102's historical accuracy in typing "e" after "m." In some embodiments, a calculated overshooting distance may have a direct relationship to key distance and historical accuracy. That is, processor 122 may calculate a smaller overshooting distance for two keys that are closer in proximity in keyboard image 140, and calculate a smaller overshooting distance for keys which user 102 is historically accurate at typing.

Motion features may be determined using known image and motion data analysis methods, and determining the most probable intended positions of hands 104 and fingers 106 based on the determined motion features. Using the determined motion features, processor 122 may identify a likely key as the key user 102 intends to select next, and select the likely key even when processor 122 determines that user 102 selected another key other than the likely key.

In some embodiments, processor 122 may predict the next key while user 102 is typing. The prediction may use at least one of a word completion algorithm and a prior key selected using information associated with at least one location of the user hand 104 or one or more fingers 106. Processor 122 may employ known word completion algorithms, but in some embodiments, processor 122 may predict a next key using a word completion algorithm in conjunction with received sensor 110 information to increase key prediction accuracy. For example, processor 122 may predict a next key using at least one of a word completion algorithm and a prior key selected using information associated with at least one change of location of the user 102's hand 104 location or one or more finger 106. As another example, processor 122 may predict a next key using at least one of a word completion algorithm and a previously selected key using information associated with one or more motion features of the user 102's moving hand 104.

In some embodiments, processor 122 may be configured to determine, in advance of a word completion, a likely word/phrase that the user is typing using the word completion algorithm, and instruct display 130 to display the likely word. In some embodiments, the likely word/phrase may include proper names, sayings, and slogans, titles, such as titles of music albums or movies. Processor 122 may monitor received sensor 110 information to recognize an orientation of hand 104 that is indicative of acceptance or rejection of the likely word by user 102. In some embodiments, the hand orientation recognized for likely word acceptance/rejection may comprise a stationary pose of one or more hands 104 or fingers 106, or an animated gesture of one or more hands 104 or fingers 106. For example, processor 122 may determine that, after determining a likely word and instructing display 130 to display the likely word, user 102 positioned a hand 104 in a first orientation that is predefined as representing acceptance of the displayed likely word. In some embodiments, processor 122 may determine that user 102 accepts the likely word when processor 122 recognizes a gesture such as user 102 moving a hand 104 away from user 102's body, or user 102 moving a hand 104 or a plurality of fingers downward in a "tapping down" motion. In some embodiments, processor 122 may determine that user 102 rejects the likely word when processor 122 recognizes a gesture of user 102 moving a hand away from user 102's body, or user 102 moving a hand 104 or a plurality of fingers upward in a "tapping up" motion. The hand orientation and gesture examples are non-limiting, and other orientations and gestures for accepting or rejecting likely words may be preprogrammed or defined by user 102 during a setup or learning process. Processor 122 may then complete the likely word based on recognition of the first hand 104 orientation, without requiring further typing input.

As another example, processor 122 may determine that, after determining a likely word and instructing display 130 to display the likely word, user 102 positioned a hand 104 in a second orientation that is predefined as representing rejection of the displayed likely word. Processor 122 may cease display of the likely word and continue monitoring information received from sensor 110 for typing input, and/or may determine a second likely word based on the word completion algorithm, and display the second likely word.

Triggering Keyboard Display

To initiate interaction with a virtual keyboard, in some embodiments processor 122 may instruct display 130 to display a keyboard automatically when user 102's hands 104 are raised to one of a set of predefined positions such as, for example, a typing position having one or more hands 104 raised, one or more fingers 106 spread apart, hands 104 raised and positioned next to one another, one or more hands 104 raised to a plane of sensor 110, or one or more hands 110 in a raised position and a hand orientation parallel to the floor. This functionality allows the system to omit display of the keyboard and make it available only when needed, thus conserving power and increasing a level of interactivity between user 102 and system 100. In some embodiments, processor 122 may continuously process information received from sensor 110 to detect the presence of user 102 within sensor 110's field of view and to detect one or more of hand 104 position and movement. In some embodiments, when processor 122 detects that one or more hands 104 are moved from a lowered position into a raised position, such as raising hands 104 from user 102's sides upward and above a predetermined height threshold such as a waist or chest level, processor 122 may instruct display 130 to display keyboard image 140 due to detection of at least one raised hand. In some embodiments, processor 122 may instruct display 130 to cease display of keyboard image 140 when the one or more raised hand 104 is lowered, such as when user 102 drops one or more hands 104 from the waist or chest level down to user 102's sides, or below a predetermined height threshold. In some embodiments, processor 122 may delay the instruction to cease displaying keyboard image 140 for a predetermined period of time following the detection of the lowered hand(s), to confirm user 102's intention to cease display by keeping the one or more hands 104 lowered. Processor 122 may trigger the display of keyboard image 140 based on detection of only one hand, or require detection of both hands to transition from an activated to deactivated display state, and vice versa.

In some embodiments, it is desirable to avoid misinterpreting user 102's intended actions, such as presenting keyboard image 140 when user 102 raises one or more hands 104 without the intent to type. In such embodiments, processor 122 may require satisfaction of one or more predefined conditions for displaying keyboard image 140 and for ceasing display of keyboard image 140. For example, in some embodiments the keyboard image 140 may only be presented when a typing capability is available for user 102, only when certain computer applications are running that support data entry or typing, or only in certain computer applications that support typing, such as displayed searchable TV guide in a television application. In this example, processor 122 may not display keyboard image 140 during movie playback (a portion of the television application that does not support typing) despite user 122 providing the same hand orientation and position. In some embodiments, processor 122 may provide a visual indication that user 102's hand is detected as positioned and/or oriented in a hand pose that would trigger display of keyboard image 140, but without displaying keyboard image 140 itself.

Keyboard Row Selection

In some embodiments, when typing on a virtual keyboard, rather than the traditional motion of moving a finger forward or back to strike a key in the upper or lower rows, effectiveness may be increased when users move their full hands to select upper or lower rows. In such embodiments, processor 122 may be configured to select different portions of the displayed keyboard for data input detection. For example, processor 122 may select a first subset of keys based on a particular movement, gesture, hand position, or pose detected based on monitored hand positions in received sensor data. Processor 122 may be configured to select a different subset of keys based on a different detected movement, gesture, hand position, or pose. In some embodiments, the subset of keys may be a row on a keyboard, or a block of keys.

FIG. 5A illustrates an example of selecting first and second subsets of keys based on a first detected motion, where the subsets of keys are a first row 506 and a second row 508 on a displayed keyboard 512, and the detected movement is a generally horizontal movement of one or more hands toward the displayed keyboard 512. As shown in FIG. 5A, first row 506 may be a subset of keys that is not necessarily arranged in a straight line, but may include a first plurality of keys corresponding to the monitored positions of user 102's fingers 106 when hands 104 are in a first position such as H1 502. Similarly, second row 508 may include a second plurality of keys corresponding to the locations if user 102's hands 104 or fingers 106 when hands 104 are in a second position such as H2 504.

In the embodiment shown in FIG. 5A, processor 122 may receive sensor data from sensor 110 associated with movement of user 102's hands 104 from a first position H1 502 to a second position H2 504. The movement may be a generally toward or away from the displayed keyboard 512, such as a generally horizontal movement along a Z axis relative to the displayed keyboard 512. After detecting an forward movement, processor 122 may transition a selection of keys from a first row 506 to a second row 508 (transition 510). After transitioning, processor 122 may cause display 130 to alter the displayed keyboard 512, such as by graphically illustrating the selection of second row 508. In the example shown in FIG. 5A, black circles appear over keys that processor 122 determines corresponding to a monitored finger 106 position. The displayed black circles may move from first row 506 to second row 508 after executing transition 510. In other embodiments, keyboard image 512 may display a different indication of transition 510, or may not display any indication of transition 510.

Notably, in some embodiments both first row 506 and second row 508 may include one or more common keys. For example, if a particular key in keyboard image 512 corresponds to a finger 106 in both first position H1 502 and second position H2 504, then the key may be included in both first row 506 and second row 508, such as one of the keys illustrated in the right column of keyboard image 512.

In some embodiments, processor 122 may select a lower row upon detecting movement from second position H2 504 to first position H1 502, such as a generally backward movement away from displayed keyboard 512, such as a horizontal movement along a Z axis away from displayed keyboard 512.

FIG. 5B illustrates another example of keyboard row selection using detection of a second hand movement. In the embodiment shown in FIG. 5, processor 122 may receive sensor data from sensor 110 associated with movement of user 102's hands 104 from a first position H1 502 to a second position H2 504. The movement may be a generally upward or downward movement, such as a vertical movement along a Y axis parallel to the displayed keyboard 512. After detecting an upward movement, processor 122 may transition a selection of keys from a first row 506 to a second row 508 (transition 510). After transitioning, processor 122 may cause display 130 to alter the displayed keyboard 512, such as by graphically illustrating the selection of second row 508. In the example shown in FIG. 5B, black circles appear over keys that processor 122 determines correspond to a monitored finger 106 positions. The displayed black circles may move from first row 506 to second row 508 after executing transition 510. In other embodiments, keyboard image 512 may display a different indication of transition 510, or may not display any indication of transition 510.

In some embodiments, processor 122 may select a lower row after detecting a generally downward movement from second position H2 504 to first position H1 502, such as a vertical downward movement along a Y axis parallel to keyboard image 512.

As used herein, the phrase "for example," "such as," "for instance," and variants thereof describe non-limiting embodiments of the presently disclosed subject matter. Reference in the specification to "one case," "some cases," "other cases," or variants thereof means that a particular feature, structure or characteristic described in connection with the embodiment(s) is included in at least one embodiment of the presently disclosed subject matter. Thus the appearance of the phrase "one case," "some cases," "other cases," or variants thereof does not necessarily refer to the same embodiment(s).

Certain features which, for clarity, are described in this specification in the context of separate embodiments, may also be provided in combination in a single embodiment. Conversely, various features which are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The operations in accordance with the embodiments disclosed herein may be performed by a computer specially constructed for the desired purposes or by a general purpose computer specially configured for the desired purpose by a computer program stored in a non-transitory computer readable storage medium.

Particular embodiments have been described. Other embodiments are within the scope of the following claims.

What is claimed is:

1. A non-transitory computer readable medium comprising instructions that, when executed by at least one processor, cause the at least one processor to perform operations comprising:
    displaying an image of a keyboard, the displayed keyboard image including a plurality of keys;
    receiving, from at least one sensor, sensor data of a user's hand spaced a distance from the displayed keyboard image, the user's hand being in non-contact with the displayed keyboard image;
    tracking, using the received sensor data, one or more fingers of the user's hand in air a distance from the displayed keyboard image;
    correlating locations of the one or more fingers in the air with images of the plurality of keys, wherein the correlation does not require any indication of the one or more fingers touching the displayed keyboard image; and
    selecting keys from the image of the keyboard based on detection of a predefined finger gesture performed by the user's hand, and at least one of the correlated locations of the finger in the air before the detected predefined finger gesture or a location of the user's hand.

2. The non-transitory computer-readable medium of claim 1, further configured to cause the at least one processor to display the image of the keyboard on a display device.

3. The non-transitory computer-readable medium of claim 1, further configured to cause the at least one processor to display the keyboard image in air, separated from any physical device or surface.

4. The non-transitory computer-readable medium of claim 1, further configured to cause the at least one processor to:
  display an image of a virtual mouse at a distance from the user;
  detect a first hand pose and a second hand pose;
  enable a keyboard mode for selection of at least one key from the displayed keyboard when the first hand pose is detected;
  enable a mouse mode for manipulation of the virtual mouse when the second hand pose is detected; and
  enable the user to switch between the keyboard mode and the mouse mode by changing between the first hand pose and the second hand pose.

5. The non-transitory computer-readable medium of claim 4, wherein the second hand pose is a generally upward pointing finger.

6. The non-transitory computer-readable medium of claim 4, wherein the second hand pose is a generally closed hand.

7. The non-transitory computer-readable medium of claim 1, further configured to cause the at least one processor to assign areas in space to alphanumeric keys on the keyboard, and wherein the areas in space assigned to each key vary in size depending on criteria including an expected frequency of key usage.

8. The non-transitory computer-readable medium of claim 1, further configured to cause the at least one processor to assign larger areas in space for keys that are more frequently used, and to assign smaller areas in space for keys that are less frequently used.

9. The non-transitory computer-readable medium of claim 1, further configured to cause the at least one processor to dynamically vary an area in space assigned to a particular key based on a prediction that the particular key will be selected next.

10. The non-transitory computer-readable medium of claim 1, further configured to cause the at least one processor assign larger areas in space to one or more keys when the user hand is still.

11. The non-transitory computer-readable medium of claim 1, wherein the at least one processor avoids overshooting by predicting a next key that will be selected using motion features of the user's hand.

12. The non-transitory computer-readable medium of claim 11, further configured to cause the at least one processor to predict the next key using at least one of a word completion algorithm and a prior key selected using information associated with at least one location of the user hand or one or more fingers.

13. The non-transitory computer-readable medium of claim 11, further configured to cause the at least one processor to predict the next key using at least one of a word completion algorithm and a prior key selected using information associated with at least one change of location, of the user's hand location or one or more finger.

14. The non-transitory computer-readable medium of claim 11, further configured to cause the at least one processor to predict the next key using at least one of a word completion algorithm and a prior key selected using information associated with the motion features of the user moving hand.

15. The non-transitory computer-readable medium of claim 1, further configured to cause the at least one processor to selectively display the keyboard image and wherein the display of the keyboard image is triggered by detection of at least one raised hand.

16. The non-transitory computer-readable medium of claim 15, further configured to cause the at least one processor to cease display of the keyboard image when the raised hand is lowered.

17. The non-transitory computer-readable medium of claim 1, further configured to cause the at least one processor to monitor a hand position and a finger position in the received sensor data, and wherein the monitored hand position is used to determine a selected keyboard row and the monitored finger position is used to determine a selected key.

18. The non-transitory computer-readable medium of claim 17, wherein the selected keyboard row is determined based on a horizontal motion in the monitored hand position representing forward or backward movement.

19. The non-transitory computer-readable medium of claim 17, wherein the selected keyboard row is determined based on a vertical motion in the monitored hand position representing upward or downward movement.

20. The non-transitory computer-readable medium of claim 1, further configured to cause the at least one processor to determine in advance of a word completion, a likely word that the user is typing, display the likely word, recognize a hand orientation indicative of a user's acceptance of the likely word, and to accept the likely word in response to the recognized hand orientation.

21. The non-transitory computer-readable medium of claim 20, wherein the recognized hand orientation includes an animated gesture.

22. The non-transitory computer-readable medium of claim 1, further configured to cause the at least one processor to determine in advance of a word completion, a likely word that the user is typing, display the likely word, recognize a hand orientation indicative of a user's rejection of the likely word, and to reject the likely word in response to the recognized hand orientation.

23. The non-transitory computer-readable medium of claim 20, wherein the recognized hand orientation includes an animated gesture.

24. A data input device, comprising:
  at least one processor configured to display an image of a keyboard, the displayed keyboard image including a plurality of keys;
  receive, from at least one sensor, sensor data of a user's hand spaced a distance from the displayed keyboard image, the user's hand in non-contact with the displayed keyboard image;
  track, using the received sensor data, one or more fingers of the user's hand in air a distance from the displayed keyboard image;
  correlate locations of the one or more fingers in the air with images of the plurality of keys, wherein the correlation does not require any indication of the one or more fingers touching the displayed keyboard image; and
  select keys from the image of the keyboard based on the correlated locations of the one or more fingers in the air, and a detection of a predefined gesture performed by the finger.

25. The data input device of claim 24, wherein the at least one processor is further configured to display the image of the keyboard on a display device.

26. The data input device of claim 24, wherein the at least one processor is further configured to display the keyboard image in air, separated from any physical device or surface.

27. The data input device of claim 24, wherein the at least one processor is further configured to:
display an image of a virtual mouse at a distance from the user;
detect a first hand pose and a second hand pose;
enable a keyboard mode for selection of at least one key from the displayed keyboard when the first hand pose is detected;
enable a mouse mode for manipulation of the virtual mouse when the second hand pose is detected; and
enable the user to switch between the keyboard mode and the mouse mode by changing between the first hand pose and the second hand pose.

28. The data input device of claim 27, wherein the second hand pose is a generally upward pointing finger.

29. The data input device of claim 27, wherein the second hand pose is a generally closed hand.

30. The data input device of claim 24, wherein the at least one processor is further configured to assign areas in space to alphanumeric keys on the keyboard, and wherein the areas in space assigned to each key vary in size depending on criteria including an expected frequency of key usage.

31. The data input device of claim 24, wherein the at least one processor is further configured to cause the at least one processor to assign larger areas in space for keys that are more frequently used, and to assign smaller areas in space for keys that are less frequently used.

32. The data input device of claim 24, wherein the at least one processor is further configured to dynamically vary an area in space assigned to a particular key based on a prediction that the particular key will be selected next.

33. The data input device of claim 24, further configured to cause the at least one processor assign larger areas in space to one or more keys when the user hand is still.

34. The data input device of claim 24, wherein the at least one processor is further configured to predict a next key that will be selected, using motion features of the received images to avoid overshooting.

35. The data input device of claim 34, wherein the at least one processor is further configured to predict the next key using at least one of a word completion algorithm and a prior key selected using information associated with at least one location of the user hand or one or more fingers.

36. The data input device of claim 34, wherein the at least one processor is further configured to predict the next key using at least one of a word completion algorithm and a prior key selected using information associated with at least one change of location, of the user's hand location or one or more finger.

37. The data input device of claim 34, wherein the at least one processor is further configured to predict the next key using at least one of a word completion algorithm and a prior key selected using information associated with the motion features of the user moving hand.

38. The data input device of claim 24, wherein the at least one processor is further configured to selectively cause the keyboard image to be displayed and wherein the display of the keyboard image is triggered by detection of at least one raised hand.

39. The data input device of claim 38, wherein the at least one processor is further configured to cause the keyboard image display to cease when the raised hand is lowered.

40. The data input device of claim 24, wherein the at least one processor is further configured to monitor a hand position and a finger position in the received sensor data, and wherein the monitored hand position is used to determine a selected keyboard row and the monitored finger position is used to determine a selected key.

41. The data input device of claim 40, wherein the selected keyboard row is determined based on a horizontal motion in the monitored hand position representing forward or backward movement.

42. The data input device of claim 40, wherein the selected keyboard row is determined based on a vertical motion in the monitored hand position representing upward or downward movement.

43. The data input device of claim 24, wherein the at least one processor is further configured to determine in advance of a word completion, a likely word that the user is typing, to cause a display of the likely word, to recognize a hand orientation indicative of a user's acceptance of the likely word, and to accept the likely word in response to the recognized hand orientation.

44. The data input device of claim 43, wherein the recognized hand orientation includes an animated gesture.

45. The data input device of claim 24, wherein the at least one processor is further configured to determine in advance of a word completion, a likely word that the user is typing, display the likely word, recognize a hand orientation indicative of a user's rejection of the likely word, and to reject the likely word in response to the recognized hand orientation.

46. The data input device of claim 45, wherein the recognized hand orientation includes an animated gesture.

* * * * *

UNITED STATES PATENT AND TRADEMARK OFFICE
CERTIFICATE OF CORRECTION

PATENT NO. : 10,203,812 B2
APPLICATION NO. : 15/028098
DATED : February 12, 2019
INVENTOR(S) : Itay Katz Page 1 of 1

It is certified that error appears in the above-identified patent and that said Letters Patent is hereby corrected as shown below:

In the Claims

Claim 10, Column 21, Lines 43-44, "processor assign" should read as --processor to assign--.

Claim 33, Column 23, Line 36, "processor assign" should read as --processor to assign--.

Signed and Sealed this
Twenty-third Day of April, 2019

Andrei Iancu
*Director of the United States Patent and Trademark Office*